US006699173B1

(12) United States Patent
Boris

(10) Patent No.: US 6,699,173 B1
(45) Date of Patent: Mar. 2, 2004

(54) CANOPY SEAL FOR INFANT CARE APPARATUS

(75) Inventor: Joseph Boris, Cockeysville, MD (US)

(73) Assignee: Datex Ohmeda, Inc., Madison, WI (US)

( * ) Notice: Subject to any disclaimer, the term of this patent is extended or adjusted under 35 U.S.C. 154(b) by 0 days.

(21) Appl. No.: 10/219,728

(22) Filed: Aug. 15, 2002

(51) Int. Cl.[7] .......................... A61G 11/00; F16J 15/14; F02F 11/00; B65G 1/133

(52) U.S. Cl. ......................... 600/22; 277/590; 277/596; 414/217

(58) Field of Search ............................ 600/22; 119/419; D30/108; 296/217, 210; 49/479.1, 484.1; 601/43; 128/205.26, 205.13; 414/217, 940; 206/711; 293/100.09, 210; 160/351; 285/114, 184, 235, 369; 215/11.1, 11.5; 428/60, 31; 264/245; 277/590, 596

(56) References Cited

U.S. PATENT DOCUMENTS

| | | | | | |
|---|---|---|---|---|---|
| 4,215,649 | A | * | 8/1980 | Vorbeck | 119/419 |
| 4,221,423 | A | * | 9/1980 | Stone | 296/100.09 |
| 4,334,500 | A | * | 6/1982 | Ziller | 119/419 |
| 4,481,938 | A | * | 11/1984 | Lindley | 601/43 |
| 5,225,261 | A | * | 7/1993 | Kargarzadeh | 428/60 |
| 5,558,371 | A | * | 9/1996 | Lordo | 285/114 |
| 5,895,191 | A | * | 4/1999 | Bonora et al. | 414/217 |
| 6,030,031 | A | * | 2/2000 | Martinus Lenkens | 296/217 |
| 6,213,935 | B1 | * | 4/2001 | Mackin et al. | 600/22 |
| 6,231,499 | B1 | * | 5/2001 | Jones | 600/22 |
| 6,286,697 | B1 | * | 9/2001 | Gasparini | 215/11.5 |
| 6,419,623 | B1 | * | 7/2002 | Dykes et al. | 600/22 |
| 2001/0034977 | A1 | * | 11/2001 | Hattori | 49/479.1 |

* cited by examiner

*Primary Examiner*—Eric F. Winakur
*Assistant Examiner*—Nikita R Veniaminov
(74) *Attorney, Agent, or Firm*—Roger M. Rathbun

(57) ABSTRACT

An infant care apparatus having a canopy movable vertically with respect to an infant platform. The canopy has a lower edge mating with upper peripheral edges of a plurality of vertical walls forming an infant compartment. At least one of the vertical walls is a door pivotally affixed to the infant platform and rotates between open and closed positions. A seal is located on the lower edge of the canopy to seal against the upper peripheral edge of the vertical walls. An elongated flange of the seal is affixed to the canopy by hardware and a cover flap extends downwardly from the upper edge of the flange to cover the hardware. A sealing flap extends downwardly and inwardly toward the infant compartment from the lower edge of the flange. A flexible material is co-extruded with the seal for the sealing flap and a hinge between the flange and the cover flap.

19 Claims, 4 Drawing Sheets

CANOPY SEAL FOR INFANT CARE APPARATUS

BACKGROUND

The present invention relates to an infant care apparatus and, more particularly, to an apparatus with an infant compartment having a canopy that moves in a vertical direction and seals against upstanding vertical panels forming that infant compartment.

There is, at the present, a type of infant care apparatus that combines the function of an infant warmer having a planar surface for supporting an infant with radiant heat directed toward that infant and an incubator where that infant is actually contained within an infant compartment where the surrounding environment for the infant including heat, and possibly humidity, are carefully controlled to improve the well being of the infant.

One such apparatus is shown and described in U.S. Pat. No. 6,231,499 B1 of Thomas C. Jones and U.S. Pat. No. 6,213,935 B1 of Mackin et al. With that particular apparatus, there is a canopy that can be raised and lowered with respect to an infant platform. When the canopy is in its upper position, an overhead radiant heater directs infrared energy toward an infant positioned on the infant platform to warm the infant, while, on the other hand, when the canopy is in its lower position, a convective heating system located beneath the infant platform provides heat to the infant.

As can be seen from a review of the aforedescribed U.S. patents, the infant compartment is formed, not only by the hood in its lower position but also by a plurality of vertical upstanding walls that extend upwardly from the infant platform forming a generally rectangular upper peripheral edge when all of the walls are in the vertical position. It can also be seen that at least one of the vertical walls, and preferably three of such walls, can be opened by the user for access to the infant contained within the infant compartment and therefore, those walls are also doors that are pivotally affixed to the infant platform at the lower edge of the doors, such that the user can swing the doors outwardly and downwardly in obtaining access to that infant.

Accordingly, one of the difficulties of such apparatus is that there must be an effective seal between the lower edge of the canopy and the upper peripheral edge of the vertical walls so that the desired thermal environment can be achieved and maintained within the infant compartment when that canopy is in its lower position. Also, at least one of the walls is, in effect, a door that is pivotally affixed to the infant platform so that the door can be opened and closed by the user. As such, the door swings outwardly and downwardly in opening the door and, of course, swings upwardly and inwardly in closing the door. Since the door is operable, that is, it can be opened and closed with the canopy in its lower position, not only must the seal between the canopy and the door be effective with respect to the vertical movement of the canopy, but the seal must also be effective in providing a seal against the upper edge of the door as it pivots about the infant platform.

Too, the seal must be economical to produce and install in order to minimize the cost to the overall apparatus. In addition, since the infant compartment itself is normally humidified, there is considerable moisture present and therefore the seal must be designed so as to not collect that moisture in order to avoid creating a favorable location for the growth of bacteria or simply for collecting water. As a further feature, it would be advantageous to have some means of covering or hiding the mounting hardware so that the outer appearance of the seal, as well as the apparatus itself, is aesthetically appealing.

SUMMARY OF THE INVENTION

Accordingly, the present invention relates to an infant care apparatus that has an improved seal located between the lower edge of the canopy and the upper peripheral edge of the vertical walls forming the infant compartment.

With the present invention, the infant care apparatus is of the type previously outlined, that is, there is a canopy that is movable vertically with respect to the infant platform and which has a lower edge that seals against the upper peripheral edge formed by the plurality of vertical walls that enclose the infant compartment. Thus, with the seal of the present invention, there is an efficient seal that is made between the vertically movable canopy and those vertical walls that include a door that can pivot outwardly and downwardly. The seal of this invention is effective in both instances, that is, against the canopy vertical movement as well as against the rotational movement of the door.

The seal of this invention is a one piece or unitary extruded construction so that it can be produced, stored and shipped relatively inexpensively. Also, the seal is comprised of differing materials with each material having different properties of flexibility. There is an elongated flange of a generally rigid material that is used to affix the seal to the lower edge of the canopy and which seal thereby extends along that lower edge and around the entire lower peripheral edge of the canopy. The elongated rigid flange is preferably constructed of a plastic extrudable material such as polyvinyl chloride (PVC).

That rigid flange has a sealing flap that extends at an angle downwardly and inwardly from the lower portion of the elongated flange toward the infant compartment and preferably that sealing flap has a generally planar upper surface so that any moisture that is formed on the generally planar edge simply drips downwardly by the force of gravity and falls from the sealing flap so that moisture is not retained or collected on the seal.

The sealing flap is comprised of a material that is more flexible that the rigid material used for the flange that affixes the seal to the lower edge of the canopy. By more flexible, it is meant that the sealing flap is a flexible material that also has good sealing properties, and one material that has been found to be well suitable for such material is a polyolefin that is available from Advanced Polymer Alloys under the name ALCRYN. Thus, while the PVC for the flange is a rigid material, the sealing flap is com of a flexible material of about 80 A Shore durometer and therefore more flexible than the material used for the sealing flap. That material is flexible and yet provides a good seal against the upper vertical walls and does not have a material that migrates to the surface, as does PVC, that eventually become sticky and adheres to the surface of the vertical walls and cause a sticking problem upon the opening of those vertical walls when employed as doors.

In addition, such material, albeit having a differing flexibility than the rigid polyvinyl chloride material of the flange, can be co-extruded along with the flange such that the overall seal of this invention can be readily extruded as a single, unitary piece construction with the differing materials in the extrusion and thus is relatively convenient and inexpensive to produce.

The seal also has a cover flap that extends downwardly from the upper edge of the elongated flange and encloses the outer surface of the flange. As such, the cover flap is used to cover the mounting hardware, such as screws, that secure the elongated flange to the lower edge of the canopy so as to improve the overall appearance of the seal and the infant care apparatus itself. The lower or distal end of the cover flap is also releasably affixed to the elongated flange by an interlocking arrangement where the lower or distal edge of the cover flap can be easily locked into a suitable shaped recess formed in the lower area of the elongated flange.

Thus, that lower, distal edge of the cover flap can be secured to the elongated flange along the entire length of the elongated flange so as to provide a good appearance of the seal and the infant care apparatus. The interlocking of the distal edge of the cover flap and the recess of the elongated flange can readily be accomplished similar to the functioning of a zip lock by the user simply moving a pressure means, such as a finger, along the cover flap to secure it within the recess of the elongated flange and the distal edge of the cover flap can be just as easily detached from the elongated flange.

Obviously, the cover flap is unsecured when the elongated flange is being mounted to the lower edge of the canopy so that access can be had to the screws or other type of mounting hardware and when that mounting is complete, the user can readily affix or lock the distal edge of the cover flap to the recess formed in the lower area of the elongated flange to complete the assembly of the seal to the canopy.

Again, by the process of co-extrusion, there is a material having more flexibility than the rigid material that forms the elongated flange and the cover flap and that more flexible material is co-extruded into the seal as the extrusion process takes place and which forms a flexible hinge in the seal between the upper edge of the elongated flange and the upper portion of the cover flap. As such, the cover flap is flexibly affixed to the upper edge of the elongated flange and can more easily be manipulated to lock and unlock the distal edge of the cover flap to the lower portion of the elongated flange. In the preferred embodiment, as stated, the rigid material used for the flange and for the cover flap itself is preferable polyvinyl chloride while the more flexible material used to form the more flexible hinge intermediate the elongated flange and the cover flap is ALCRYN.

With the use of the differing materials used in the co-extrusion of a unitary seal, there is a significant difference in the flexibility of the ALCRYN material and the polyvinyl chloride material such that the former material acts well as a sealing material for the sealing flap as well as a flexible material that is well suited to be used in the formation of a hinge intermediate the rigid, elongated flange and the cover flap.

These and other features and advantages of the present invention will become more readily apparent during the following detailed description taken in conjunction with the drawings herein.

DETAILED DESCRIPTION OF THE INVENTION

Figure 1:
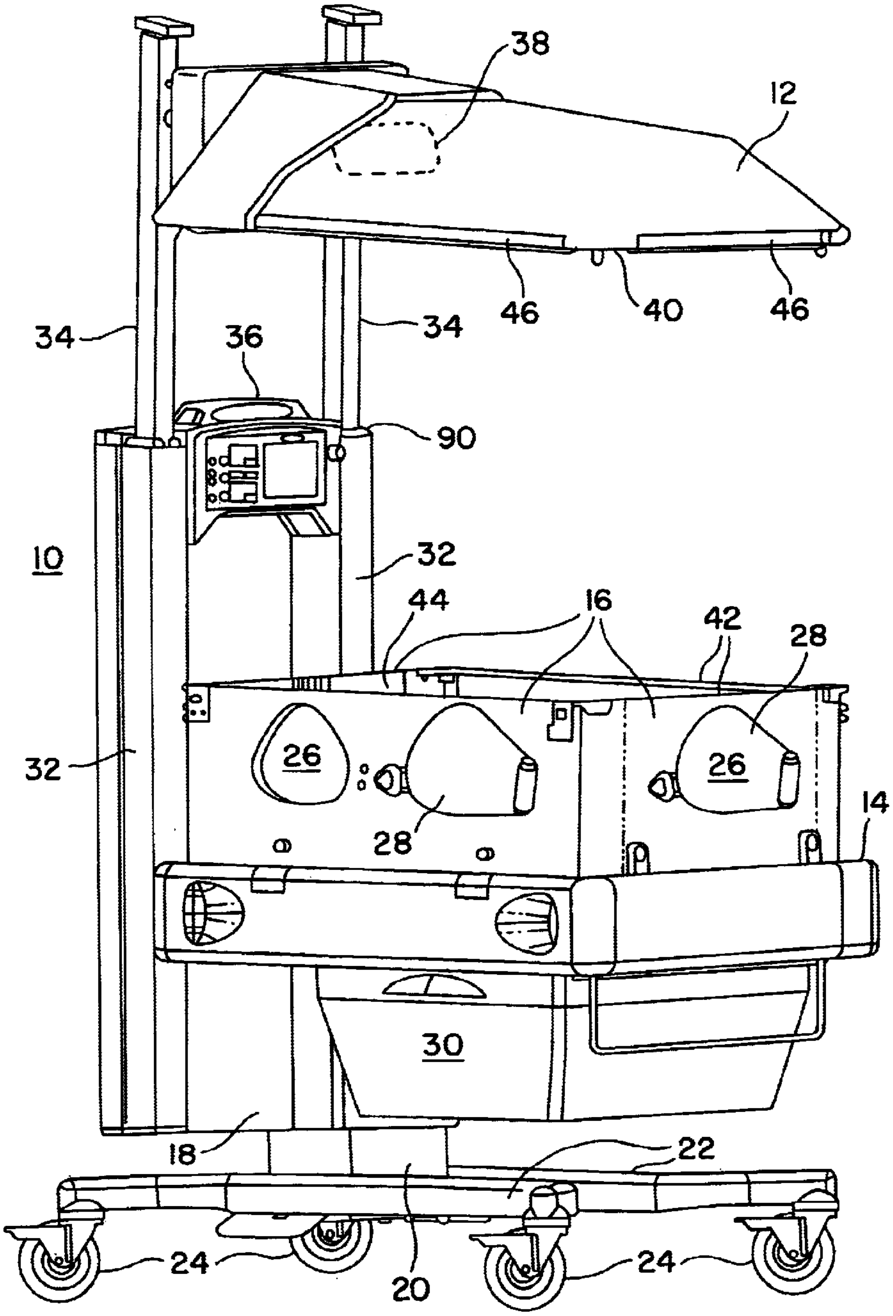
FIG. 1 is a perspective view of the infant care apparatus constructed in accordance with the present invention wherein the canopy containing a radiant heater is shown in its upper position.
Figure 2:
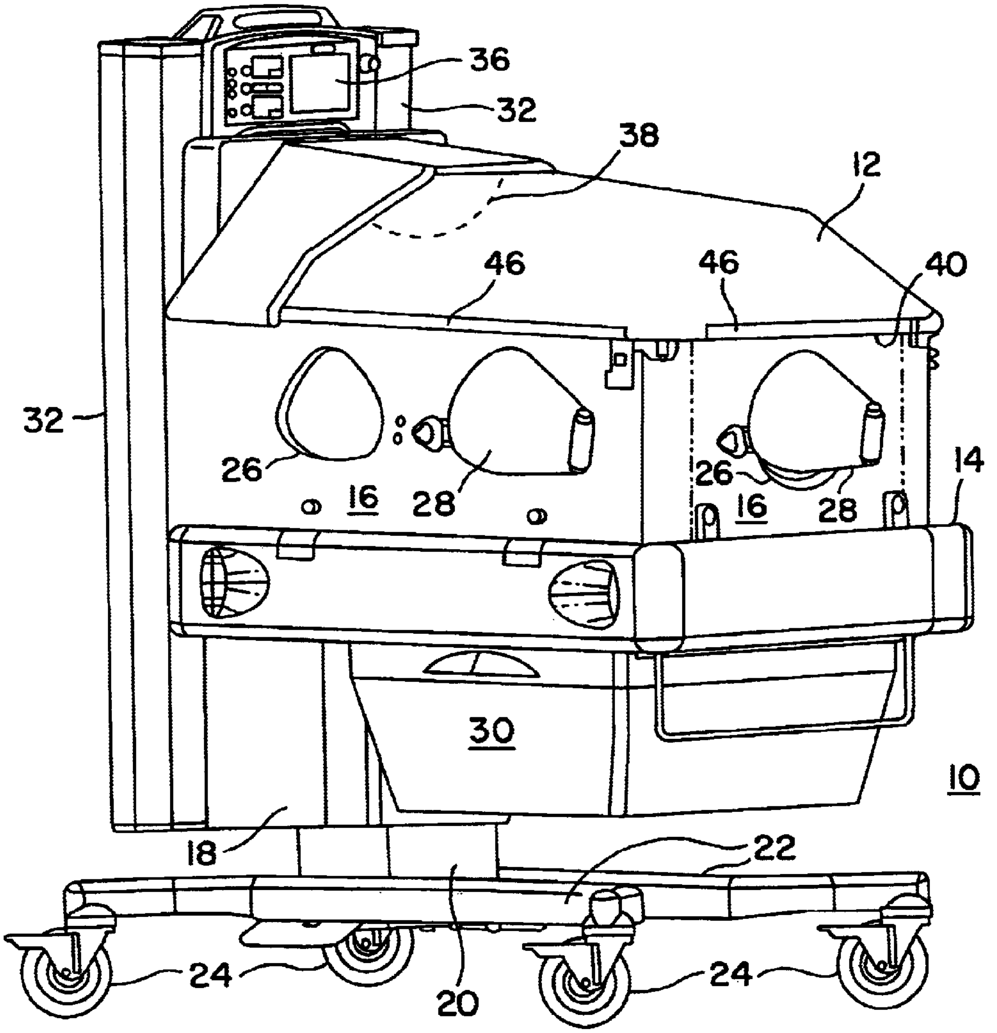
FIG. 2 is a perspective view of the apparatus of FIG. 1 but showing the canopy in its lower position.

Referring now to FIG. 1, there is shown a perspective view of an infant care apparatus 10 constructed in accordance with the present invention with the canopy 12 in its upper position. Referring also to FIG. 2, there is a perspective view of the infant care apparatus 10 as shown in FIG. 1 but with the canopy 12 in its lower position. As will be understood, in the FIG. 1 position, the infant care apparatus 10 acts as an infant warmer with considerable access to the infant for performing interventions on the infant and in the FIG. 2 configuration, the infant care apparatus 10 acts as an incubator with the infant confined within a protective environment and having a controlled atmosphere to provide warmth as well as controlled humidity for that infant.

As shown, the infant care apparatus 10 includes an infant platform 14 that underlies and supports an infant. As is also seen, a plurality of vertically oriented walls 16 are provided to contain the infant safely within the infant care apparatus 10 and are located at all of the four sides of the infant platform 14. The walls 16 are preferable constructed of transparent plastic material and, as will be explained, cooperate with other components in order to provide an incubator function to the infant care apparatus 10 when in the FIG. 2 configuration.

The infant platform 14 is mounted to a vertical movable base member 18 which, in the preferred embodiment, is movably affixed to a stationary vertical base member 20, which, in turn, is mounted to a base 22 having wheels 24 for ready movement of the infant care apparatus 10.

The vertical movable base member 18 is preferably mounted so that the user can adjust the height of the infant platform 14 by raising and lowering the vertical movable base member 18 as desired, thus the infant platform 14 can be adjusted to the preferred height by the user. As further standard features, the walls 16 have handholes 26 to afford access to the infant when in the incubator configuration of FIG. 2, and which generally have doors 28 that can be opened to obtain access to the infant and, of course, closed when the particular intervention has been completed to preserve the desired environment surrounding the infant.

Another convenient feature includes a drawer 30 to retain supplies or other devices needed to carry out some operation on the infant and which is normally located beneath the infant platform 14. The walls 16 are pivotally mounted at their lower portions to the infant platform 14 by means of hinges 17 such that at least one, and preferably three, of the vertical walls 16 is also a door that can be swung outwardly and downwardly to open those walls 16 and, of course, closed by swinging upwardly and inwardly. The vertical walls 16 are also adapted to be easily removed from the infant platform 14 for cleaning and maintenance of the vertical walls 16. As such, therefore, when the canopy 12 of the infant care apparatus 10 is in its upper position as shown in FIG. 1, the walls 16 can be dropped downwardly or removed altogether so that the attending personnel can have unlimited access to an infant resting on the infant platform 14 to perform interventions on that infant.

Further structural components of the infant care apparatus 10 include stationary frame members 32 that are affixed to the base member 18 and, as shown, there are two vertical stationary frame members 32 in the preferred embodiment although there may be only one or there may be further numbers of such members. Two vertical movable frame members 34 are movably fitted into the vertical stationary frame members 32 and which can be moved upwardly and downwardly by the user as shown and described in U.S. Pat. No. 6,231,499 B1 of Thomas C. Jones, the disclosure of which is hereby incorporated herein by reference.

A control module 36 is conveniently positioned intermediate the vertical stationary frame members 32 and may include displays of various monitored parameters as well as include the various controls for operation of the functions of the infant care apparatus 10.

As may now be seen in general, in the operation of the infant care apparatus 10, the canopy 12, in the preferred embodiment, houses a radiant heater 38 that can provide a source of infrared energy to be directed toward an infant when situated on the infant platform 14. The canopy 12 can be moved between its lower position as shown in FIG. 2 and its upper position as shown in FIG. 1 depending upon the mode of operation desired by the user.

In the upper position of FIG. 1, the infant care apparatus 10 functions as an infant warmer where there is full access to the infant and where the overhead radiant heater 38 supplies heat to maintain the infant with sufficient warmth. In the lower position of FIG. 2, the infant care apparatus 10 functions as a normal incubator, since the lower edge 40 of the infant canopy 12 fits fully over the combined upper peripheral edges 42 of the walls 16 to form therein, an infant compartment 44 that is provided with warm air and controlled humidity in the normal functioning of an incubator.

As seen, specifically in FIG. 2, when the infant care apparatus 10 is functioning as an incubator, the canopy 12 is in its lower position and the lower edge 40 of the canopy 12 fits against the upper peripheral edges 42 of the vertical walls 16 and, therefore to maintain the protective and controlled environment within the infant compartment 44, it is necessary to provide a seal 46 along the lower edge 40 of the canopy 12 to seal that lower edge 40 against the upper peripheral edges 42.

Figure 3:
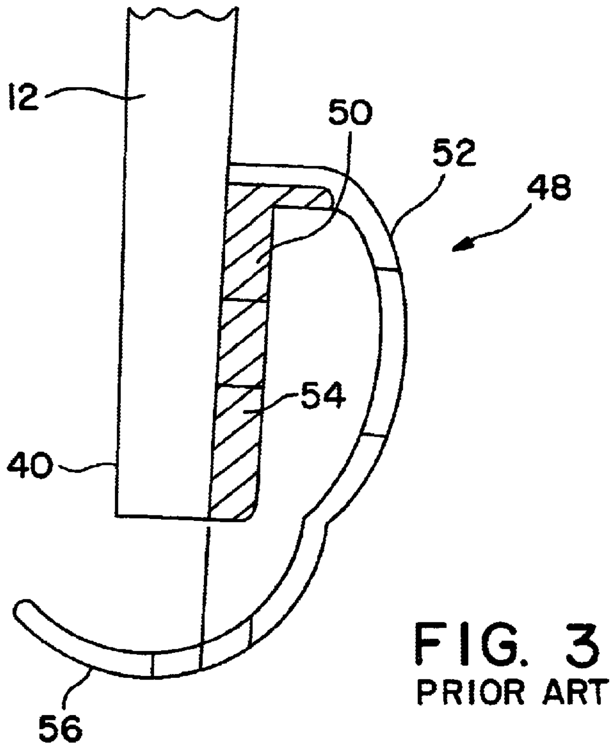
FIG. 3 PRIOR ART
FIG. 3 is a side cross-sectional view of a prior art seal used with the apparatus of FIGS. 1 and 2.

Turning now to FIG. 3, there is shown a cross sectional view of a prior art seal 48 that has been used on the infant care apparatus described with respect to FIGS. 1 and 2. As can be seen, the prior art seal 48 is affixed to the lower edge 40 of the canopy 12 and that affixation can be by screws (not shown) that pass through the prior art seal 48 and the lower edge 40. The prior art seal 48 includes an elongated flange 50 that is actually affixed to the lower edge 40 of the canopy 12. A flap 52 extends downwardly from the upper portion of the elongated flange 50 around the front surface 54 of the elongated flange 50, that is, the surface that faces outwardly from the lower edge 40 of canopy 12 so as to cover the screws that affix the prior art seal 48 to that lower edge 40 and has a distal end 56 that curves upwardly so that the prior art seal 48 can seal against the vertical wall 16, (FIGS. 1 and 2) when the sealing function is due to the vertical movement of the canopy 12 or the swinging motion of one of the vertical walls 16 when utilized as a door.

Due to the co-extrusion process, the elongated flange 50 is constructed of a fairly rigid polyvinyl chloride material and the flap 52 is constructed of a more flexible polyvinyl chloride material so that the flap 52 is sufficiently flexible to be pulled upwardly in securing the screws through the elongated flange 50 to mount the prior art seal 48 to the canopy 12.

The prior art seal 48 did act to provide an acceptable seal between the canopy 12 and the vertical walls 16, however it had a few disadvantages, namely, the upwardly curved distal end 56 collected moisture from the humidity within the infant compartment and acted as a rain gutter such that the collected water spilled out when disturbed such as when a door was opened and deposited the water back into the infant compartment. The overall shape and the material of the prior art seal 48 was flexible and thus had a tendency to change its profile during shipping. Additionally, the polyvinyl chloride material itself is a relatively sticky substance that tended to migrate and stick to the door such that opening the door became a difficult task.

Figure 4:
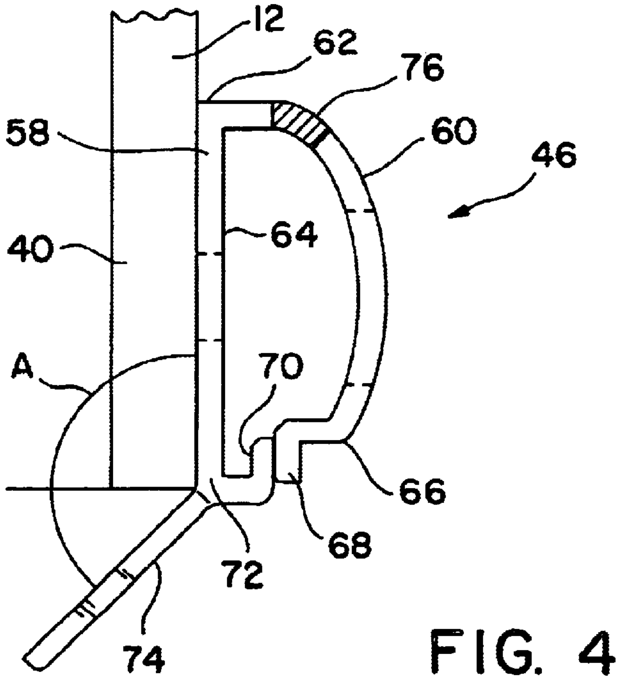
FIG. 4 is a side cross-sectional view of a seal constructed in accordance with the present invention.

Turning now to FIG. 4, there is shown a cross sectional view of a seal 46 constructed in accordance with the present invention. As can be seen, the seal 46 includes an elongated flange 58 that, again, is adapted to be affixed to the acrylic lower edge 40 of the canopy 12 with mounting hardware, such as screws (not shown). The elongated flange 58 is preferably about 0.060 inches in thickness to achieve the desired rigidity and strength to affix the elongate flange 58 to the lower edge 40 of the canopy 12 and is constructed of a rigid plastic material that can be extruded and the preferred material is polyvinyl chloride (PVC). With the rigid nature of that material, the elongated flange 58 has some flexibility so as not to easily broken during shipping, handling and the like, however it is also sufficiently strong so as to be affixed by the mounting hardware to be firmly retained to the lower edge 40 of the canopy 12. The vertical height of the elongated flange, as viewed in FIG. 4 is about 0.900 inches.

The seal 46 has a cover flap 60 that extends downwardly from the upper edge 62 of the elongated flange 58 and the cover flap 58 covers the front surface 64 of the elongated flange 58 so as to hide the mounting hardware, such as the screws, that are used to mount the seal 46 to the lower edge 40 of the canopy 12. The distal end 66 of the cover flap 60 is formed into a downward directed tab 68 that fits into a recess 70 formed in the lower portion 72 of the elongated flange 58.

A sealing flap 74 extends downwardly from the lower portion 72 of the elongated flange 58 and the sealing flap 74 is generally a flat, planar surface of about 0.050 inches in thickness and that extends inwardly at an angle of between about 120 degrees and 150 degrees, and more preferably about 135 degrees, from the plane of the elongated flange 58, shown as angle A, so that the sealing flap 74 cannot collect moisture and also so that the sealing flap 74 can provide a good sealing surface between the lower edge 40 of the canopy 14 as it descends vertically downwardly as well as with the vertical wall 16 (FIGS. 1 and 2) as that wall acts as a door pivoting about its lower edge as it closes. Preferably, the sealing flap 74 is about 0.545 inches in length The sealing flap 74 is constructed of a material that is more flexible than the PVC used for the construction of the elongated flange 58 and that material is also chosen to have a good sealing exterior surface that is fairly slippery and which does not become sticky over time and create problems in the opening of the walls 16 (FIGS. 1 and 2). Since the sealing flap 74 is co-extruded along with the rigid elongated flange 58, the actual junction of the differing materials is a smooth transition such that there is simply a material change as the sealing flap 74 extends outwardly from the lower portion 72 of the elongated flange 58. As stated, the preferred material for the sealing flap 74 is a polyolefin material that is available from Advanced Polymer Alloys under the name ALCRYN. That material has good sealing properties, is considerably more flexible than PVC and can be co-extruded with PVC as a unitary, one piece seal in accordance with the present invention.

There is also co-extruded into the seal 46 a strip of a different material than PVC that is located between the upper edge 62 of the elongated flange 58 and the cover flap 60, shown as a hinge 76 and the material of the hinge 76 is more flexible than the material of the elongated flange 58 and the cover flap 60 so that the hinge 76 provides a flexibility to the cover flap 60 to enable it to easily be moved with respect to the elongated flange 58 in order to access the mounting hardware that secures the seal 46 to the lower edge 40 of the canopy 12. In the preferred embodiment, the material used for the hinge is also the polyolefin material available under the name ALCRYN, the same material that is preferably used for the sealing flap 74.

According the hinge 76 is co-extruded into the unitary, one piece seal 46 in order to allow that more flexible material to be utilized for its desired properties of increases flexibility. Thus, the material for constructing the seal 46 is polyvinyl chloride, with the exception of the sealing flap 74 and the hinge 76 such that the seal 46 is co-extruded as a one-piece, unitary construction with different materials that take advantage of the particular property of the material that is desired i.e. the sealing flap 74 is a real slippery exterior surface and is flexible so as to act as a good seal between the canopy 12 and the walls 16 (FIGS. 1 and 2) and the hinge 76 is of the more flexible material so as to provide the flexibility necessary to facilitate the opening and closing of the cover flap 60.

Figure 5:
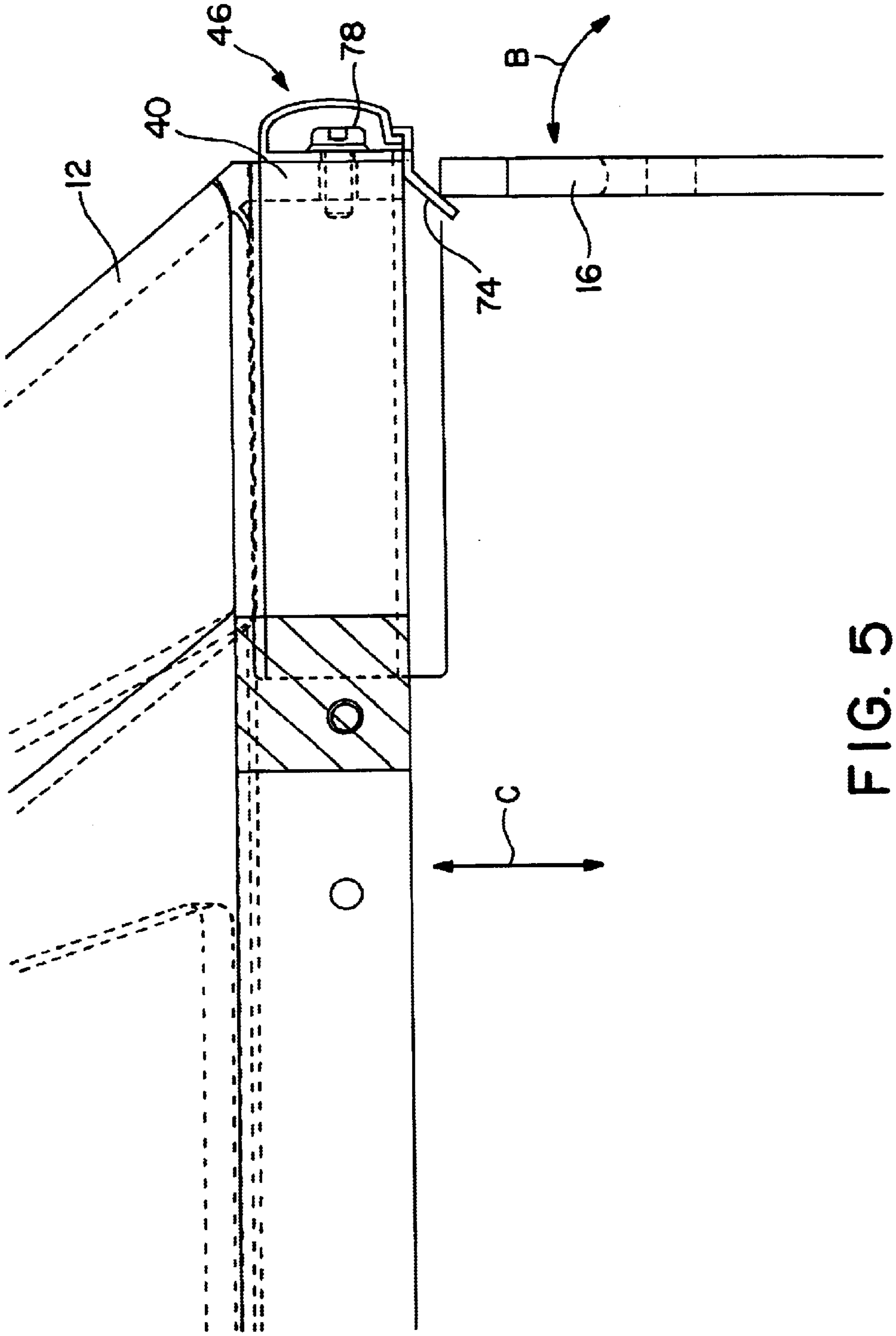
FIG. 5 is a side cross-sectional view showing the seal of the present invention affixed to the lower edge of a canopy of the infant care apparatus of FIGS. 1 and 2.

Turning finally to FIG. 5, there is shown a side cross sectional view of the seal 46 of the present invention in its mounted position to illustrate the effect of a wall 16 that is acting as a door that pivots about the infant platform (FIGS. 1 and 2) to open and close against the seal 46 as shown by the arrow B. As can be seen, due to the angle of the sealing flap 74, the wall 16 can be opened and closed and still seal against the sealing flap 74 as well as the vertically movable canopy 12 and that seal 46 is therefore utilized to effectively seal the canopy 12 against the upper peripheral edges 42 of the walls 16 in both cases, that is, whether the vertical wall 16, acting as a door, pivotally opens and closes as depicted by the arrow B or whether the canopy 12 is raised and lowered vertically with respect to the upper peripheral edge 40 of the vertical walls 16 as depicted by the arrow C.

As also can be seen there are screws 78 that are used to mount the seal 46 to the lower edge 40 of the canopy 12 and the screws 78 pass through the elongated flange 58 to bite into the lower edge 40 of canopy 12. Thus the flexibility provided to the flap 60 by means of the flexible hinge 76 (FIG. 4) constructed of a material more flexible that the PVC material used to construct the flap 40 allows the flap 60 to be raised for access to the screws 78 so the screws 78 can be tightened to carry out the mounting of the seal 46 to the lower edge 40 of the canopy 12.

When the mounting of the seal 46 has been completed, the tab 68 at the distal end 66 of flap 60 is inserted into the recess 68, thereby locking the flap 60 to the elongated flange 58 in the manner of a zip lock by running a pressure point along the distal end 66 of the flap 60. Upon completion of that locking step, the flap 60 covers the screws 78 so that the screws 78 are not visible to the user and therefore the overall infant care apparatus has a good outward appearance and is easier to maintain and clean.

Those skilled in the art will readily recognize numerous adaptations and modifications which can be made to the infant care apparatus of the present invention which will result in an improved seal, yet all of which will fall within the scope and spirit of the present invention as defined in the following claims. Accordingly, the invention is to be limited only by the following claims and their equivalents.

I claim:

1. An infant care apparatus, said infant care apparatus comprising an infant platform, a plurality of vertically oriented walls extending upwardly from said infant platform forming an infant compartment having an upper peripheral edge, a canopy having a lower edge, said canopy being vertically movable with respect to said infant platform between a lower position where said lower edge of said canopy seals against said upper peripheral edge of said walls and an upper position where said canopy is displaced upwardly from said upper peripheral edge of said walls, and a seal adapted to seal between the lower edge of said canopy and the upper peripheral edge of said walls when said canopy is in said lower position, said seal having an elongated rigid flange having an inner surface affixed to said lower edge of said canopy and having an outer surface, said seal having a sealing flap constructed of a material more flexible than said flange and said sealing flap extending downwardly from a lower edge of said flange and inwardly toward said infant compartment, said seal having a flexible cover flap extending downwardly from an upper edge of said flange to enclose the outer surface of said flange.

2. An infant care apparatus as defined in claim 1 wherein at least one of said walls is pivotally affixed to said infant platform to open outwardly and downwardly with respect to said infant compartment.

3. An infant care apparatus as defined in claim 1 wherein said cover flap has a distal edge adapted to be releasable affixed to said flange.

4. An infant care apparatus as defined in claim 1 wherein said cover flap is integrally hingedly affixed to the upper edge of said flange.

5. An infant care apparatus as defined in claim 4 wherein said cover flap is hingedly affixed to said upper edge of said flange by means of a material more flexible than said material of said flange.

6. An infant care apparatus as defined in claim 5 wherein said material is a polyolefin material and having a flexibility of about 80 A Shore durometer.

7. An infant care apparatus as defined in claim 1 wherein said sealing flap is a flat, planar surface integrally molded to said flange.

8. An infant care apparatus as defined in claim 1 wherein said sealing is comprised of flexible material of about an 80 A Shore durometer.

9. An infant care apparatus as defined in claim 2 wherein said sealing flap extends inwardly at an angle of from about 120 degrees to about 150 degrees with respect to the plane of said flange.

10. An infant care apparatus as defined in claim 9 wherein said sealing flap extends inwardly at an angle of about 135 degrees.

11. A seal adapted to be affixed to a lower edge of a canopy that fits over an upper peripheral edge, said seal comprising an elongated rigid flange having a front surface and a rear surface, said flange being adapted to be affixed to the lower edge of the canopy with said rear surface facing the lower edge, said flange being comprised of a unitary piece construction and having a lower portion and an upper portion, a sealing flap of a flexible material that extends downwardly and angularly from said lower portion of said flange, said seal further having a flexible cover flap extending from said upper portion of said flange and adapted to enclose the front surface of said flange.

12. A seal as defined in claim 11 wherein said seal includes a hinge co-extruded into the one piece seal and located between said over flap and said flange.

13. A seal as defined in claim 11 wherein said hinge is constructed of a more flexible material than the flange.

14. A seal as defined in claim 13 wherein said flange is constructed of polyvinyl chloride and said hinge is constructed of a polyolefin material.

15. A seal as defined in claim 11 wherein said cover flap has a distal end that is adapted to be locked to said lower portion of said flange.

16. A seal as defined in claim 15 wherein said lower portion of said flange has a groove formed therein, and said distal end of said cover flap is adapted to be interfitted with said groove to lock said distal end of said cover flap to said lower portion of said flange.

17. A seal as defined in claim 16 wherein said distal end of said cover flap comprises a tab adapted to be interfitted in to said groove.

18. A seal as defined in claim 11 wherein said sealing flap is comprises of a material having greater flexibility than said flange.

19. A seal as defined in claim 18 wherein said flap is comprised of PVC and said sealing flange is a polyolefin material.

* * * * *